United States Patent
Burtin

(10) Patent No.: US 6,283,518 B1
(45) Date of Patent: Sep. 4, 2001

(54) BUMPER GUARD

(76) Inventor: Stacy Burtin, 12325 Quarterback Ct., Bowie, MD (US) 20720-4397

( * ) Notice: Subject to any disclaimer, the term of this patent is extended or adjusted under 35 U.S.C. 154(b) by 0 days.

(21) Appl. No.: 09/439,329

(22) Filed: Nov. 12, 1999

(51) Int. Cl.$^7$ .................................................. B60R 19/44
(52) U.S. Cl. ................................. 293/142; 293/DIG. 6; 160/DIG. 16
(58) Field of Search ............................ 293/108, 110, 293/142, DIG. 6, 126, 127, 128; 160/DIG. 16; 24/303

(56) References Cited

U.S. PATENT DOCUMENTS

| | | |
|---|---|---|
| D. 378,909 | 4/1997 | Aycock . |
| 2,758,866 | 8/1956 | Dollar . |
| 3,529,328 * | 9/1970 | Davison .................................. 24/303 |
| 3,629,905 * | 12/1971 | Cote ........................................ 24/303 |
| 4,588,209 * | 5/1986 | Zebrowski et al. ................ 24/303 X |
| 4,690,446 | 9/1987 | Warren . |
| 4,726,614 | 2/1988 | Myers et al. . |
| 4,884,824 | 12/1989 | Radke . |
| 4,890,854 * | 1/1990 | Hoover ............................... 24/303 X |
| 5,312,145 * | 5/1994 | McNeil ................................. 293/128 |
| 5,553,981 * | 9/1996 | Braden ............................... 24/303 X |
| 5,618,073 | 4/1997 | Criscione . |
| 5,682,653 * | 11/1997 | Berglof et al. ......................... 24/303 |

OTHER PUBLICATIONS

Koroseal Flexible Magnetic Strip, Bulletin No. 24 IPC-1060-2, Apr. 1961, Report to Designers and Engineers from B.F. Goodrich Industrial Products Company, pp. 1-7.*

* cited by examiner

Primary Examiner—Joseph D. Pape
Assistant Examiner—Patricia Engle

(57) ABSTRACT

Included is a thin flexible backing constructed from a magnetic material and at least one cushion mounted on the backing. In use, the backing may be mounted on a vehicular bumper for protecting the same.

1 Claim, 3 Drawing Sheets

BUMPER GUARD

BACKGROUND OF THE INVENTION

1. Field of the Invention

The present invention relates to bumper guards and more particularly pertains to a new bumper guard for protecting a vehicular bumper from damage.

2. Description of the Prior Art

The use of bumper guards is known in the prior art. More specifically, bumper guards heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 5,618,073; U.S. Pat. No. 4,690,446; U.S. Pat. No. 2,758,866; U.S. Pat. No. 4,884,824; U.S. Pat. No. 4,726,614; and U.S. Pat. Des. 378,909.

In these respects, the bumper guard according to the present invention substantially departs from the conventional concepts and designs of the prior art, and in so doing provides an apparatus primarily developed for the purpose of protecting a vehicular bumper from damage.

SUMMARY OF THE INVENTION

In view of the foregoing disadvantages inherent in the known types of bumper guards now present in the prior art, the present invention provides a new bumper guard construction wherein the same can be utilized for protecting a vehicular bumper from damage.

The general purpose of the present invention, which will be described subsequently in greater detail, is to provide a new bumper guard apparatus and method which has many of the advantages of the bumper guards mentioned heretofore and many novel features that result in a new bumper guard which is not anticipated, rendered obvious, suggested, or even implied by any of the prior art bumper guards, either alone or in any combination thereof.

To attain this, the present invention includes a thin flexible backing constructed from a magnetic material and having a substantially planar rectangular configuration. The backing is defined by a front face, a rear face, and a periphery formed therebetween. The periphery includes an elongated top edge, an elongated bottom edge, and a pair of short side edges formed therebetween. Next provided is a matrix of at least twenty cushions constructed from a resilient material. Each cushion has a planar rear face coupled to the front face of the backing, a front face with a substantially cylindrical configuration, and a pair of end faces with a substantially semi-spherical configuration. The cushions are positioned on the backing such that a longitudinal axis of each cushion remains in parallel relationship with the top edge of the backing. The cushions terminate a distance of about ¼ a height of the backing from the bottom edge of the backing. Also included is a magnet strip mounted along the bottom edge of the backing with a thickness at least three times that of the backing. As shown in FIG. 5, a front face of the magnet strip is flush with that of the backing. A rear face of the magnet strip extends rearwardly from the backing for being folding behind a bumper of a vehicle to communicate with an upper extent of the backing. The magnet thus serves to maintain the system on the bumper of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bumper guard apparatus and method which has many of the advantages of the bumper guards mentioned heretofore and many novel features that result in a new bumper guard which is not anticipated, rendered obvious, suggested, or even implied by any of the prior art bumper guards, either alone or in any combination thereof.

It is another object of the present invention to provide a new bumper guard which may be easily and efficiently manufactured and marketed.

It is a further object of the present invention to provide a new bumper guard which is of a durable and reliable construction.

An even further object of the present invention is to provide a new bumper guard which is susceptible of a low cost of manufacture with regard to both materials and labor, and which accordingly is then susceptible of low prices of sale to the consuming public, thereby making such bumper guard economically available to the buying public.

Still yet another object of the present invention is to provide a new bumper guard which provides in the apparatuses and methods of the prior art some of the advantages thereof, while simultaneously overcoming some of the disadvantages normally associated therewith.

Still another object of the present invention is to provide a new bumper guard for protecting a vehicular bumper from damage.

Even still another object of the present invention is to provide a new bumper guard that includes a thin flexible backing constructed from a magnetic material and at least one cushion mounted on the backing. In use, the backing may be mounted on a vehicular bumper for protecting the same.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
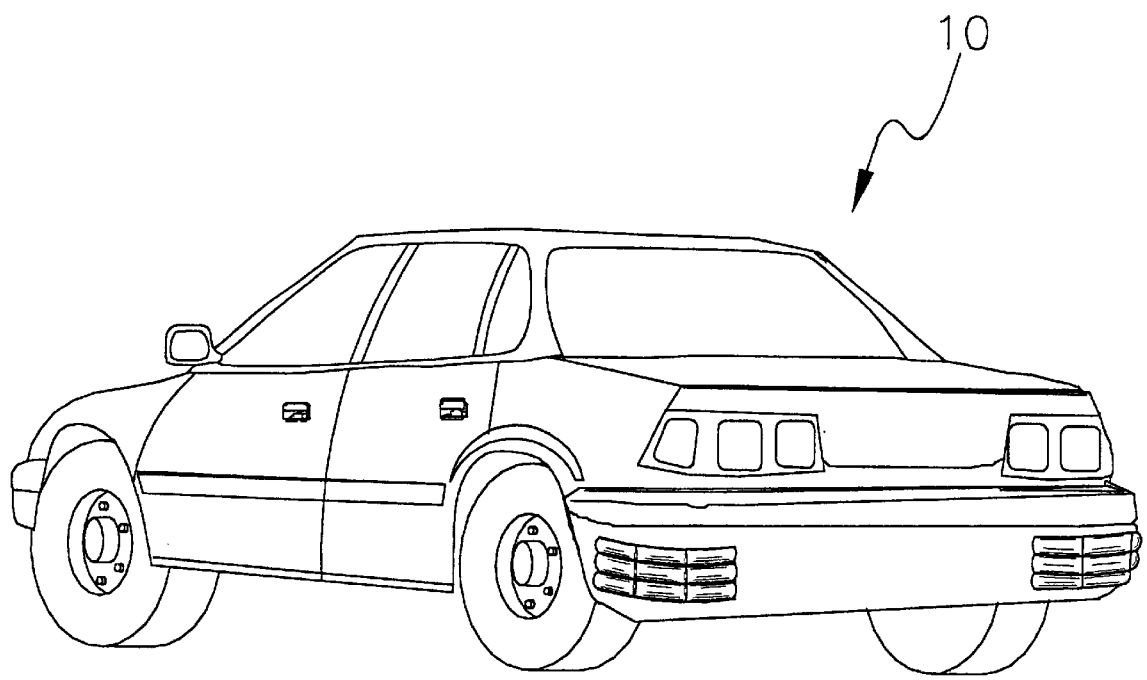
FIG. 1 is a rear view of a new bumper guard according to the present invention.
Figure 2:
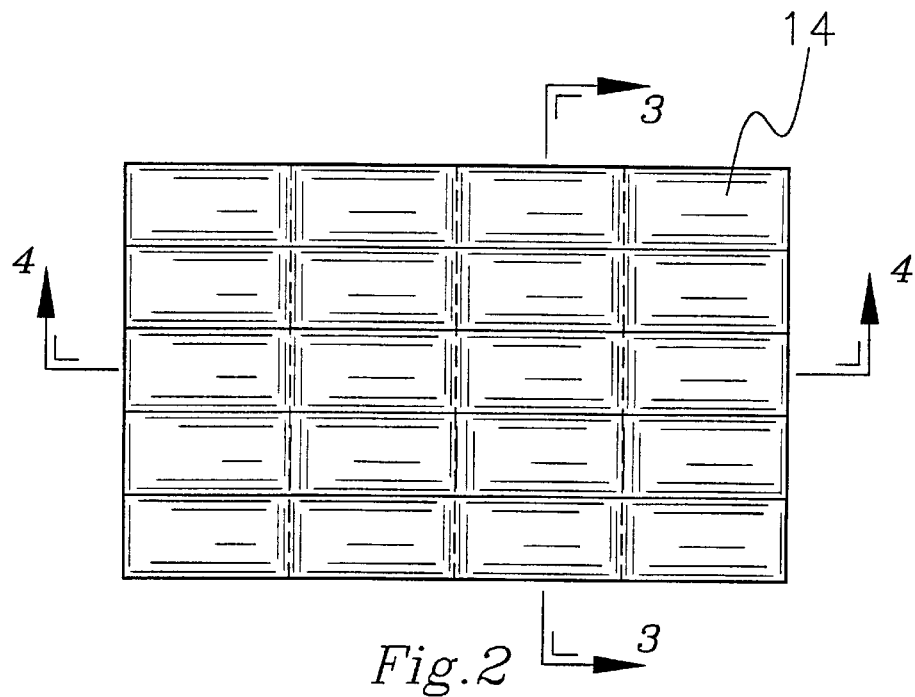
FIG. 2 is a top view of the present invention.
Figure 3:
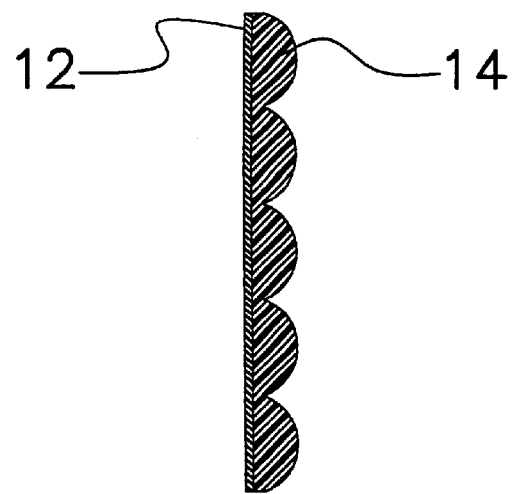
FIG. 3 is a side cross-sectional view of the present invention taken along line 3—3 shown in FIG. 2.
Figure 4:
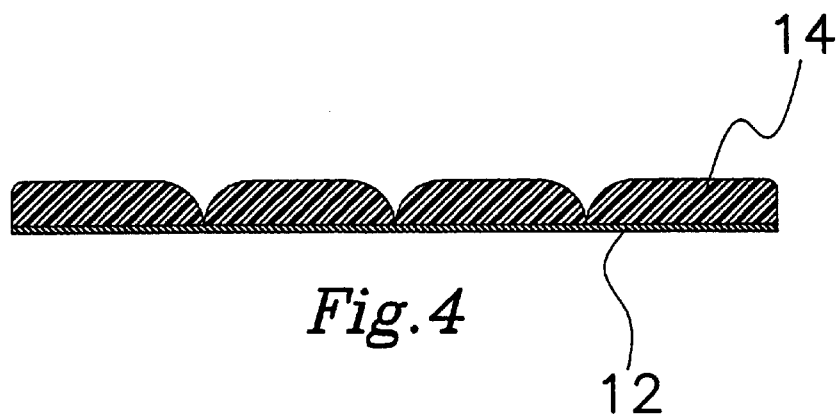
FIG. 4 is a side cross-sectional view of the present invention taken along line 4—4 shown in FIG. 2.

With reference now to the drawings, and in particular to FIGS. 1 through 5 thereof, a new bumper guard embodying the principles and concepts of the present invention and generally designated by the reference numeral 10 will be described.

The present invention, designated as numeral 10, includes a thin flexible backing 12 constructed from a magnetic material and having a substantially planar rectangular configuration. The backing is defined by a front face, a rear face, and a periphery formed therebetween. The periphery includes an elongated top edge, an elongated bottom edge, and a pair of short side edges formed therebetween.

Figure 5:
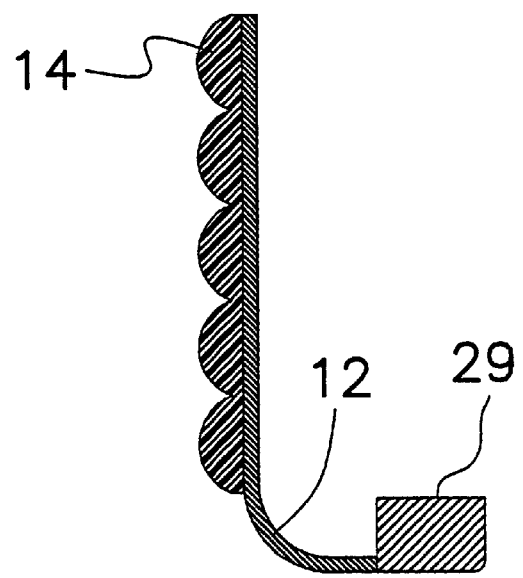
FIG. 5 is a side cross-sectional view of an optional embodiment of the present invention with the optional magnet strip.
Figure 6:
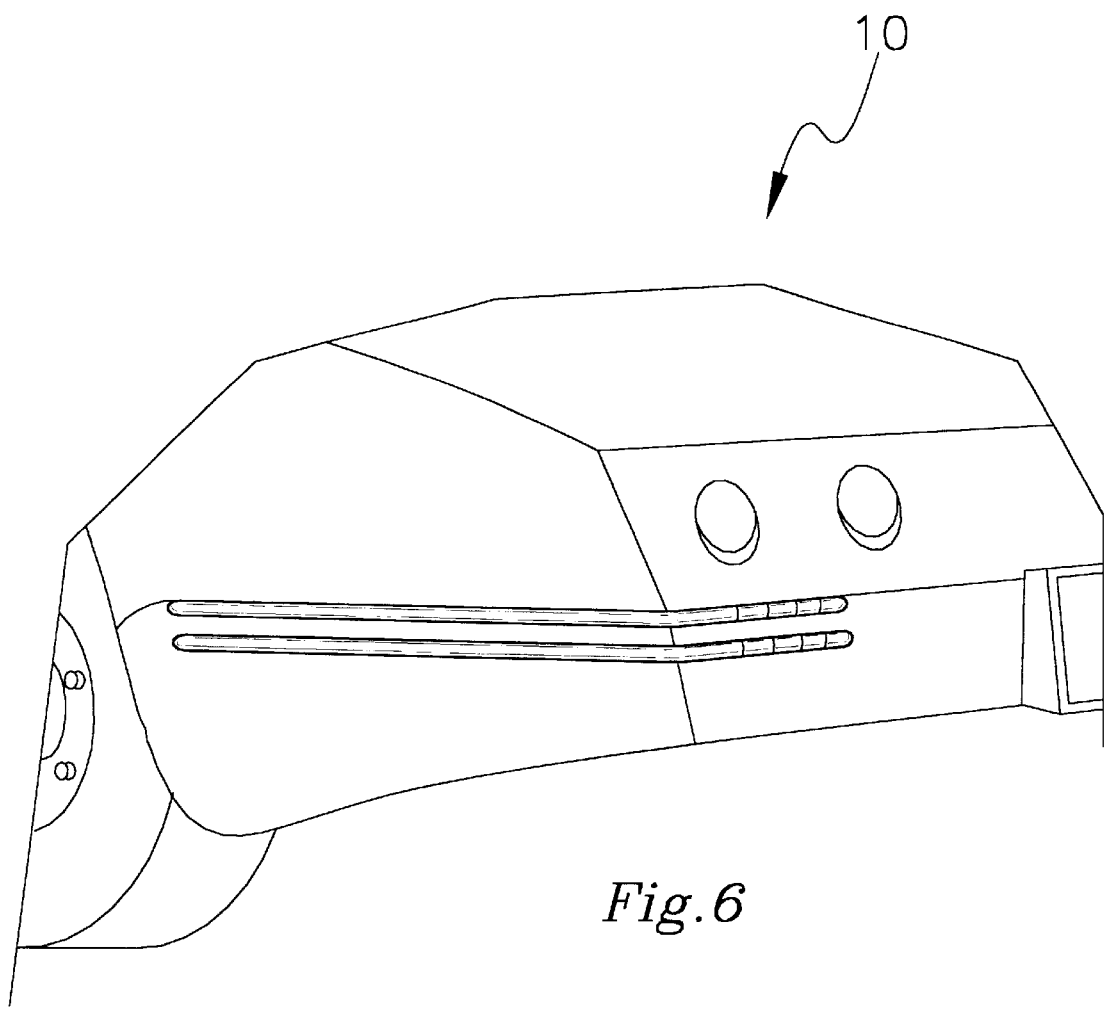
FIG. 6 is a rear view of an embodiment the present invention.

Next provided is a matrix of at least twenty cushions 14 constructed from a resilient material. Each cushion has a planar rear face coupled to the front face of the backing, a front face with a substantially cylindrical configuration, and a pair of end faces with a substantially semi-spherical configuration. The cushions are positioned on the backing such that a longitudinal axis of each cushion remains in parallel relationship with the top edge of the backing. It should be noted that the tapering edges of the cushions are critical for allowing a user to cut the backing therebetween to selectively size the present invention. As an option, the cushions terminate a distance of about ¼ a height of the backing from the bottom edge, as shown in FIG. 5.

Also as an option, a magnet strip 29 may be mounted along the bottom edge of the backing with a thickness at least three times that of the backing. As shown in FIG. 5, a front face of the magnet strip is flush with that of the backing. A rear face of the magnet strip extends rearwardly from the backing for being folding behind a bumper of a vehicle to communicate with an upper extent of the backing. The magnet thus serves to maintain the system on the bumper of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular bumper guard system for use on a bumper of a vehicle, comprising, in combination:

a vehicle, said vehicle having a bumper;

a thin flexible backing for attaching the backing to the bumper of the vehicle, said backing constructed from a magnetic material and having a substantially planar rectangular configuration defined by a front face, a rear face, and a periphery formed therebetween including an elongated top edge, an elongated bottom edge, and a pair of short side edges formed therebetween;

a matrix of at least twenty cushions formed within a piece of a resilient material, each cushion having a planar rear face coupled to the front face of the backing, a front face with a substantially cylindrical configuration, and a pair of end faces with a substantially semi-spherical configuration, each of the cushions being aligned next to each other such that grooves are formed between the cushions, the cushions are positioned on the backing such that a longitudinal axis of each cushion remains in parallel relationship with the top edge of the backing, said end faces of said cushions terminating at a distance from the bottom edge of the backing, the distance being approximately one-fourth of a height of the backing; and a magnet strip mounted along the bottom edge of the backing, the magnet strip having a thickness at least three times that of the backing, wherein a front face of the magnet strip is flush with the front face of the backing and a rear face of the magnet strip extending from the backing for being positioned behind a bumper of a vehicle.

* * * * *